United States Patent [19]
Baumann et al.

[11] 3,840,763
[45] Oct. 8, 1974

[54] LOW FLUX DENSITY PERMANENT MAGNET FIELD CONFIGURATION

[75] Inventors: Frederick William Baumann, Scotia; George Mowry Rosenberry, Elnora, both of N.Y.

[73] Assignee: General Electric Company, Schenectady, N.Y.

[22] Filed: July 9, 1973

[21] Appl. No.: 377,727

[52] U.S. Cl. .............................. 310/156, 310/261
[51] Int. Cl. ....................................... H02k 21/08
[58] Field of Search .......... 310/156, 261, 154, 152, 310/216, 218, 162–164; 198/105

[56] References Cited
UNITED STATES PATENTS

| | | | |
|---|---|---|---|
| 2,735,952 | 2/1956 | Merrill | 310/156 |
| 3,126,493 | 3/1964 | Housinger | 310/156 |
| 3,334,254 | 8/1967 | Kober | 310/156 |
| 3,424,578 | 1/1969 | Strnat et al. | 148/105 X |

FOREIGN PATENTS OR APPLICATIONS

| 1,364,424 | 5/1964 | France | 310/156 |
|---|---|---|---|

OTHER PUBLICATIONS

"Permanent Magnet DC Motor," IBM Tech. Disclosure, Vol. 10, No. 8, 1/68.

*Primary Examiner*—Donovan F. Duggan
*Attorney, Agent, or Firm*—Vale P. Myles

[57] ABSTRACT

A dynamoelectric machine having a number of low flow density, high coercive force permanent magnets mounted in its ferromagnetic core to improve the magnetic field of the machine. The magnets are positioned within a preferred range of angular orientation with respect to the main flux path of the machine to maximize magnetic flux density in the core without exceeding the core saturation flux density. The ratio of the flux density of the magnets at their maximum energy point and the core saturation flux density determines the preferred range of angles of retention of the magnets.

8 Claims, 5 Drawing Figures

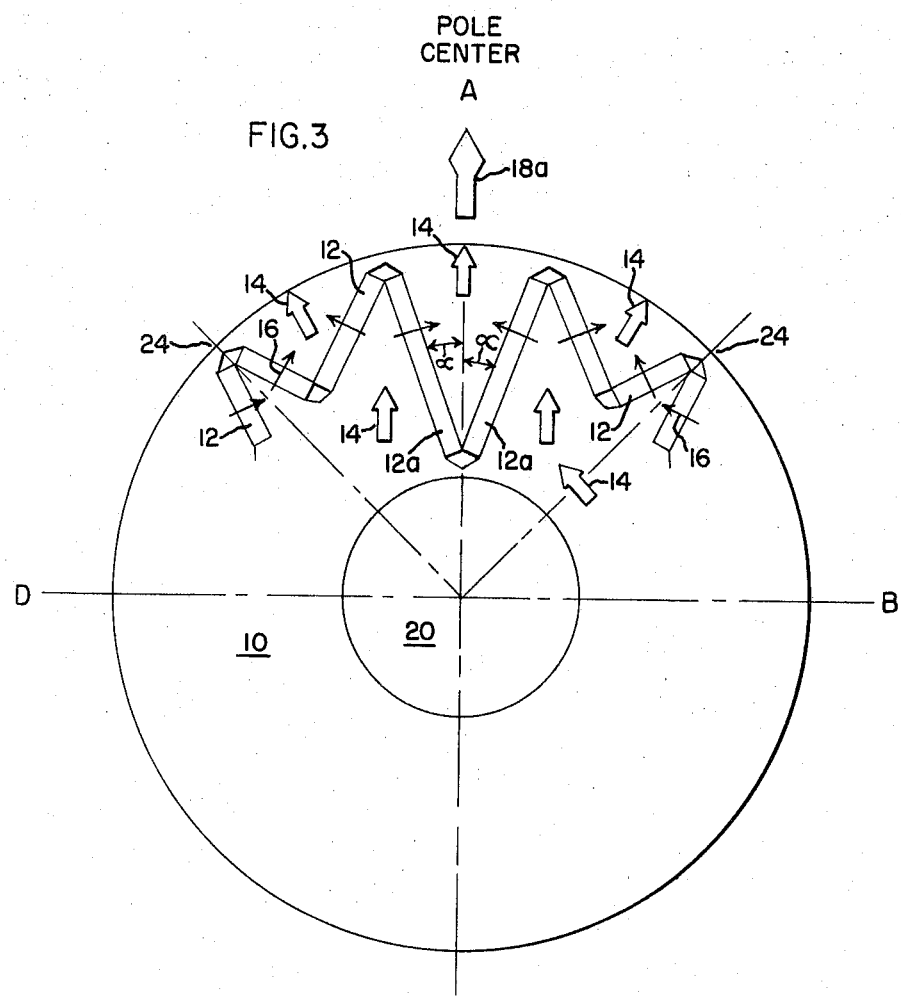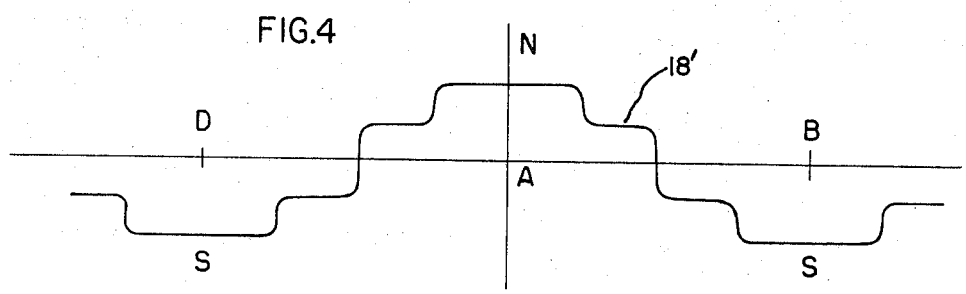

LOW FLUX DENSITY PERMANENT MAGNET FIELD CONFIGURATION

BACKGROUND OF THE INVENTION

1. Field of the Invention

This invention relates to dynamoelectric machines and more particularly to a core structure for such a machine in which a plurality of permanent magnets are used to improve the magnetic field of the machine.

2. Description of Prior Art

It is known in the prior art that permanent magnets can be mounted in suitable slots formed through the rotor of a synchronous motor to afford an effective means of building up the magnetic field of the rotor. Although the use of permanent magnet rotors is desirable because they eliminate the need for exciting a field with direct current, they also present several disadvantages. In general, the major disadvantages usually inherent in such permanent magnetic motors are that they often require a relatively large rotor to house magnets of suitable strength, and the magnets are subject to both slow demagnetization due to aging, and more rapid demagnetization due to occasional forced reversals of the permanent magnetic flux system in the machine. In prior art synchronous motors that employ permanent magnets, the magnets are protected against the demagnetization field of the motor's alternating current by suitable amortisseur windings and leakage flux paths. However, these requirements result in inefficient utilization of space within the machine and further contribute to the massive overall dimensions of such machines. These disadvantages have generally combined to cause permanent magnet machines to be more costly than other types of dynamoelectric machines.

Some of the foregoing shortcomings of permanent magnet motors have been overcome in recent years by the use of high coercive force, high flux density magnets, such as those formed of sintered barium and iron oxide. However, there continues to exist a significant need for further improvements in the structure of permanent magnet dynamoelectric machines in order to more nearly optimize their performance characteristics. The present invention largely satisfies that need by providing a means for arranging high coercive force, low flux density, segmented permanent magnets in predetermined angular configurations in the ferromagnetic rotor of a dynamoelectric machine to optimize its performance, while simultaneously minimizing the amount of unused space and thus, the overall dimensions of the machine, all of which results in lower costs of manufacture.

SUMMARY OF THE INVENTION

It is an object of the invention to provide a permanent magnet core member for a dynamoelectric machine which increases the power output and decreases the cost and overall size of the machine.

Another object of the invention is to provide a novel mounting arrangement for permanent magnets in a ferromagnetic core member of a dynamoelectric machine thereby to improve the operating characteristics of the machine.

A further object of the invention is to provide a permanent rotor magnet for a synchronous motor thereby to produce high load-carrying and pullout torque characteristics for the motor.

Additional objects and advantages of the invention will be apparent in view of the description of the preferred embodiments of it that are disclosed herein.

In one preferred form of the invention, a rotor of an electric motor formed of conventional ferromagnetic core material is provided with a plurality of relatively thin permanent magnets that are mounted within a particular range of angular orientation with respect to the main flux paths in the motor. This particular angular orientation is most advantageously determined as a function of the ratio of the flux density of the permanent magnets at their maximum energy product, or other suitable operating point, and the desired operating flux density of the core.

BRIEF DESCRIPTION OF THE DRAWINGS

A more complete understanding of the invention may be had by referring to the accompanying detailed description and drawings in which:

FIG. 3 is a sectional view of a dynamoelectric machine rotor showing an alternative permanent magnet mounting arrangement constructed pursuant to a second embodiment of the invention.

FIG. 4 is a graph of a flux waveshape developed by the rotor illustrated in FIG. 3.

DETAILED DESCRIPTION OF THE INVENTION

It has been found that optimum utilization and efficiency of a magnetic rotor can be obtained if thin permanent magnets are mounted in a particular angular relationship within the core. In accordance with the invention, this angular relationship is determined as a function of the characteristics of the permanent magnets and the core material, as will be understood from the description and explanation of the invention that follows.

Figure 1:
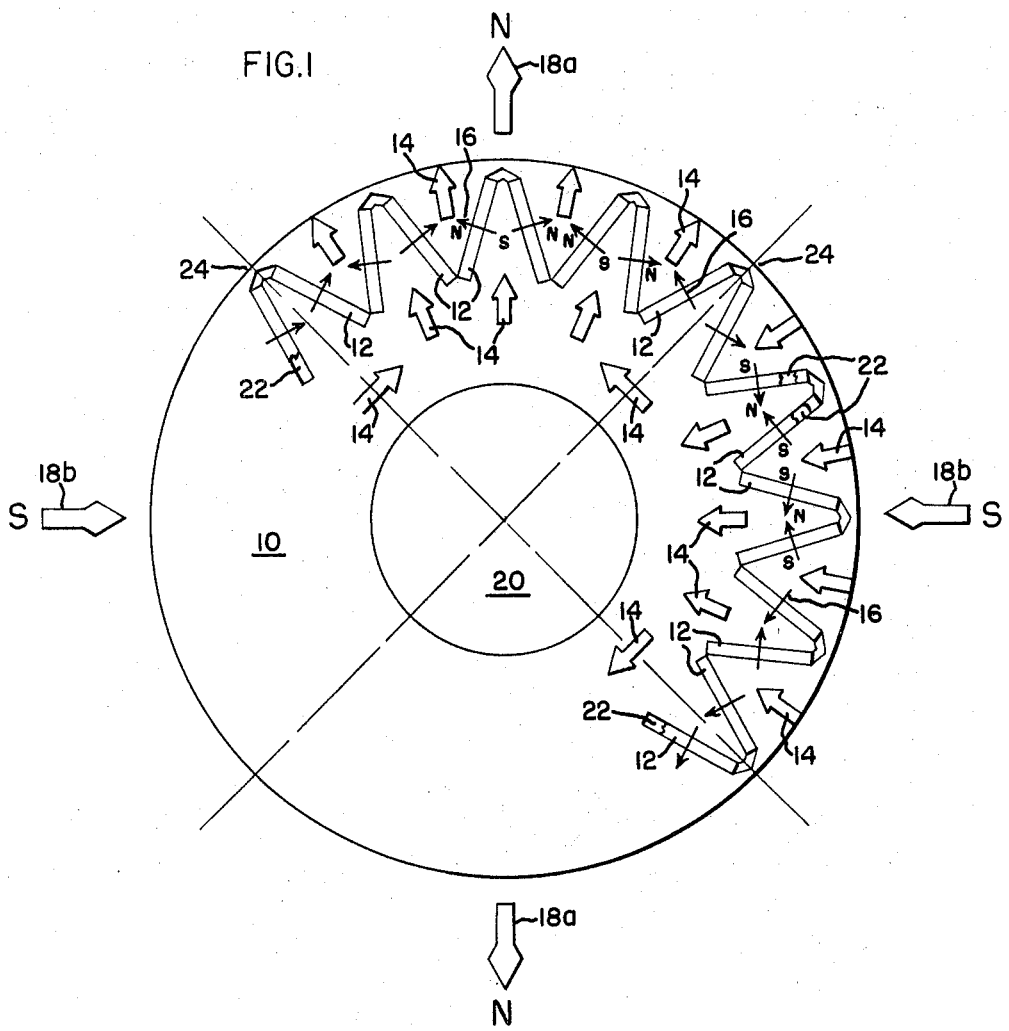
FIG. 1 is a sectional view of a dynamoelectric machine rotor showing a magnetic rotor lamination, and angularly mounted permanent magnets, constructed according to one embodiment of the invention.

Shown in FIG. 1 is a magnetic element or rotor for a dynamoelectric machine which generally comprises a core 10; a plurality of thin permanent magnets, a few being designated by the reference number 12; and some suitable means, described more fully below, for retaining each of the permanent magnets in a predetermined, fixed relationship or configuration relative to the core. The core, as is conventional, is formed of a suitable ferromagnetic material which has magnetic properties including a predetermined saturation flux density level. The individual permanent magnets are mounted so that their respective north and south magnetic poles cooperatively produce flux flowing in a plurality of main flux flow paths through the rotor, such as the main flux flow paths illustratively indicated by broad arrows 14. The north and south poles of the permanent magnets are indicated, respectively, by the point and tail of small arrows, a few of which are referenced by the number 16, and by the letters N and S, as shown. The flux in the main flux flow paths of the motor produces at least one pair of magnetic poles external to the core in any motor in which the invention is applied, and in the embodiment shown in FIG. 1, two pairs of external poles are produced. Each pair of magnetic poles includes a north and a south magnetic pole as indicated schematically by the bold diamond-headed arrows 18a and 18b, respectively. In addition, a shaft 20 is provided, mounted in the center of the rotor 10 and extending axially from it to provide an axis of rotation, as is conventional.

The type of thin permanent magnets employed in practicing the invention are cobalt rare-earth magnets, such as cobalt samarium magnets. Cobalt rare-earth magnets are typically a high coercive force, low flux density type that strongly resist demagnetization from any external source of flux, such as that found within a synchronous motor due to the energizing alternating current. Such magnets are generally available commercially in thin, segmented pieces which may easily be inserted into thin slots in the core. It should be understood that other types of permanent magnets may be employed, but, regardless of the type of magnets employed, they must have a flux density that exceeds a predetermined flux density for a given motor structure, at a maximum energy product or other chosen operating point for the motor.

Various means for retaining the permanent magnets may be used, but in the disclosed embodiment, a plurality of slots, a few of which are referenced as 22, are provided for this purpose. Each of the slots 22 extend axially through the core 10 and are adapted to receive one or more of the permanent magnets therein. It should be understood that several magnets may be arranged axially since long pieces may not be readily available for given applications of the invention. Therefore, the angle at which each permanent magnet is retained with respect to the main motor flux path is determined by the orientation of the slots. The flux from each permanent magnet contributes to the total flux in the main flux flow paths. Each angle of retention is determined in accordance with the present invention, by the ratio of the flux density at the maximum energy product or other selected operating point of each permanent magnet and the desired operating flux density of the core. The derivation of this desired ratio and the predetermined angle of retention may be understood by reference to FIG. 2, which uses the same reference numerals as in FIG. 1 to identify like parts.

Figure 2:
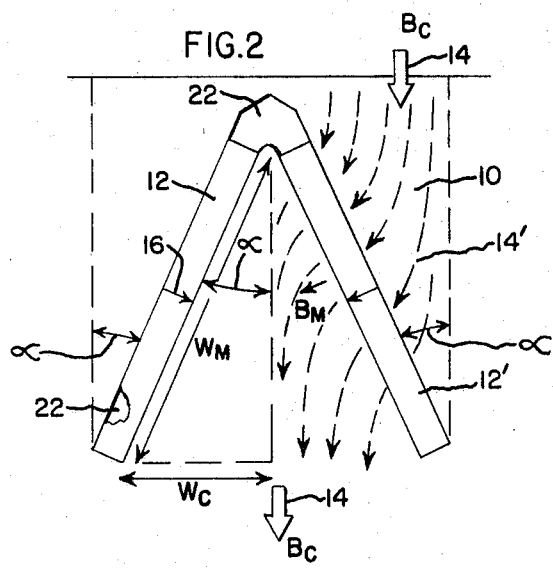
FIG. 2 is a schematic diagram that illustrates a magnetic flux path through a portion of a rotor such as that shown in FIG. 1. The diagram is used in the description of the invention to explain the preferred structure and operation of the invention.

FIG. 2 illustrates two permanent magnets 12 and 12' retained in a V-shaped configuration by means of V-shaped slot 22 in the core 10. The flux from the permanent magnets cooperatively produces the main flux flow paths 14 in the core. The flux magnitude of each magnet at its maximum energy product can be calculated by well-known methods, as discussed, for example, in the book *Permanent Magnets*, by Parker and Studders, published by John Wiley and Sons, Inc., 1962, at pages 34 to 36. The flux density at the maximum energy product or other desired operating flux density, is then chosen from the magnet characteristics. The magnet flux density is referenced vectorially by $B_M$ in FIG. 2 and illustratively, may be 27,500 lines per square inch for a typical cobalt rare-earth magnet.

The core 10 has, as one of its magnetic properties, a given design saturation flux density. The saturation flux density is the maximum desired flux density which may be chosen to prevent excessive ampere-turns loss in the core. This saturation flux density of a given material may be measured, as is well-known, and an illustrative value typical for the ferromagnetic material iron is 110,000 lines per square inch.

Optimum utilization of the magnetic properties of the available space in the core is achieved by the present invention when each permanent magnet is retained at an angle $\alpha$, thereby to yield a basic flux of 50,000 lines per square inch in the air gap adjacent core 10. Such optimum utilization occurs when the saturation flux density of the core is attained throughout the core. As shown in FIG. 2, angle $\alpha$ is the angle between one of the permanent magnets 12' and the main flux flow paths 14 at their point of entry into core 10. The flux from the magnets 12 and 12' is condensed and expanded into the main flux flow paths 14 as graphically represented by dotted lines 14'. Tracing the dotted lines 14' indicates how the main flux flow path 14 expands as it enters each magnet 12 and 12' and is condensed when it flows from these magnets. The amount of expansion and contraction of the main flux flow is determined by the angle selected for a given application of the invention, and this angle should be selected so that the saturation flux density of the core will be attained but not exceeded.

Pursuant to the invention, the angle $\alpha$ is determined by the ratio of the desired operating flux density of each magnet suitably close to the saturation flux density of the core. Because the flux density at the desired operating point of a typical magnet is less than the saturation flux density of conventional core materials retaining each permanent magnet at angle $\alpha$ causes the flux to be condensed into and expanded from a smaller cross-sectional area, thereby providing a flux density nearly equal to the saturation flux density in the core. Actual derivation of the ratio is as follows: the flux density of each magnet at its maximum energy product is inversely related to the surface area of the magnet or to width $W_M$ (see FIG. 2) of the magnet with a unit depth is considered. The flux density in the core is inversely related to the cross-sectional area through which flux flows or to width $W_C$ of the cross-section when a unit depth is considered. $W_C$ thus represents the width of a part of the cross-section of the main flux flow path through which the flux of one magnet flows. In FIG. 2, trigonometry holds that sine $\alpha$ equals $W_C/W_M$. Essentially all flux of the magnets flows into the core thus making the flux densities of the magnets and core inversely related to the widths $W_M$ and $W_C$, respectively. Substitution of the typical values for the flux densities, noted several paragraphs above, indicates sine $\alpha$ equals 27,500/11,000; therefore, for such densities, pursuant to the invention, the preferred angle $\alpha$ equals 14.5°. Thus, it has been established that the optimum angle $\alpha$ at which each permanent magnet is retained, pursuant to the invention, can be determined by the ratio of a selected magnet flux density and the core flux density.

Referring back to FIG. 1, each pair of the magnets 12 form a radially oriented V-shaped configuration, such as that shown in FIG. 2. This configuration produces optimum saturation flux density in the core 10 because the angle between each permanent magnet 12 and the polar flux flow paths 14 are all substantially $\alpha$, as well as the angle between adjacent permanent magnets being essentially $2\alpha$. The flux of the main flux flow paths form the magnetic poles 18a and 18b, and a plurality of flux flow reluctance bridges 24 separate the magnetic poles from one another at the outer periphery of the core. The reluctance bridges bypass useful flux only at those points which separate the magnetic poles and are comprised of a thin bridge of core material. The reluctance bridges function as an impedance to the flow of flux and limit the amount of leakage or non-useful flux. It will be appreciated that in some embodiments of the invention the outer surface of core 10 may be machined away to eliminate the bridges 24, thereby to further reduce the amount of leakage flux.

An alternative to the radially oriented V-shaped configuration of the invention just described is shown in FIG. 3. In this second embodiment, magnets 12a and 12b are greater in width than the other magnets 12. Consequently, magnets 12a and 12b produce flux of increased magnitude in the main flux flow paths at the center of the magnetic poles 18a and 18b, whereas magnets 12 produce flux of less magnitude at the edges of those magnetic poles. This arrangement produces a flux waveshape such as that shown in FIG. 4.

In FIG. 4 graph line 18' illustrates the magnitude of magnetic flux density in relation to circumferential position on the core 10 shown in FIG. 3. Corresponding points A, B, and D in FIGS. 3 and 4 reference the center of magnetic poles. For example, at point A in FIG. 3, the magnetic pole 18a is a point of maximum flux density. The flux magnitude generally decreases as the reference position moves from the center of the magnetic pole toward the reluctance bridges 24. At the reluctance bridge, the radial flux density is zero where the north and south magnetic poles are separated by the slot gap 24. Thus, it will be seen that by utilizing a selected combination of magnets of different widths, the angle α between respective magnets and the main flux path may be changed so that the resultant flux wave can be shaped or vaired, accordingly.

Figure 5:
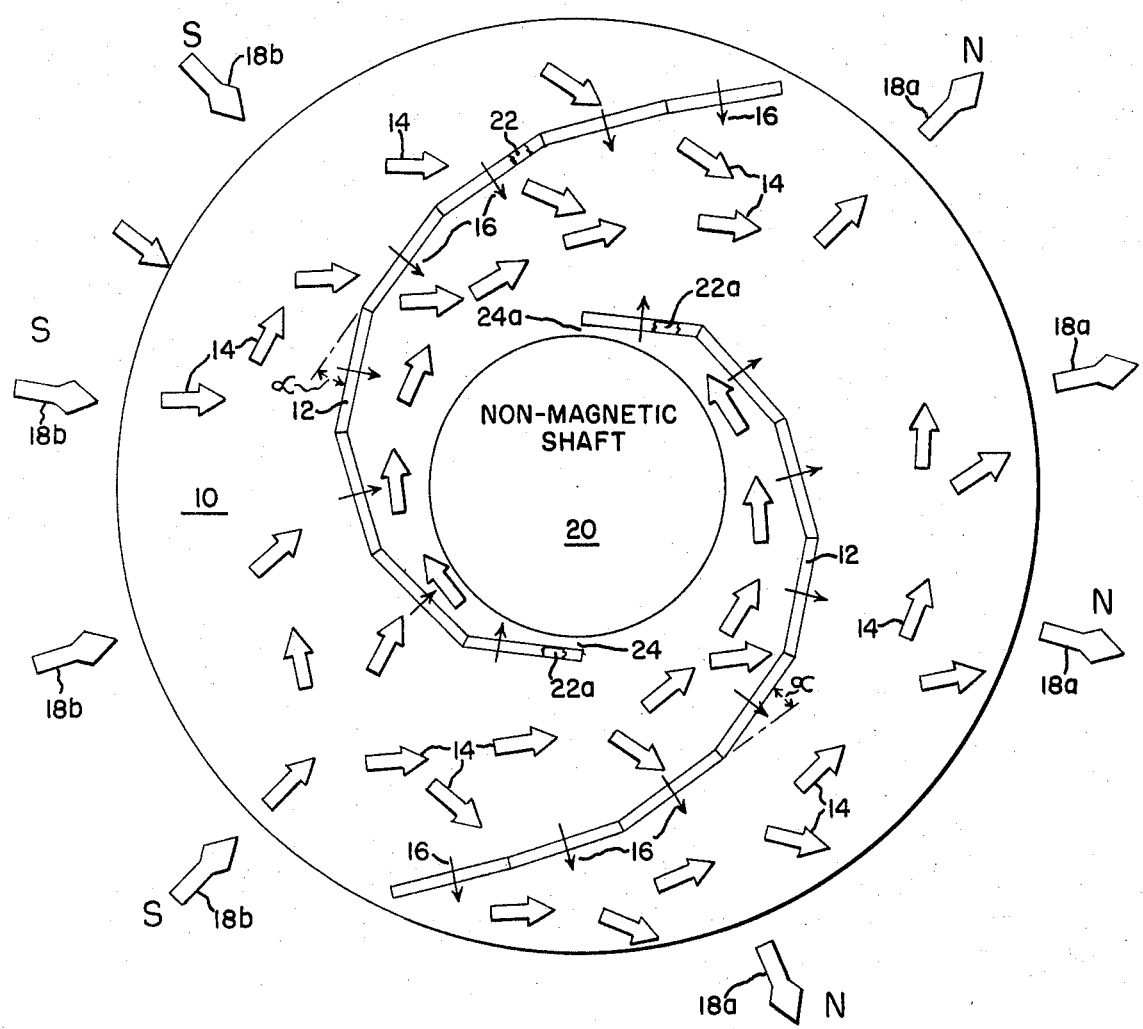
FIG. 5 is a sectional view of a dynamoelectric machine rotor showing yet another alternate embodiment of the invention.

Another embodiment of the invention is illustrated in FIG. 5, which incorporates many of the same reference numerals previously used to designate either the same elements or elements that afford similar functions. In FIG. 5 the slots 22 and 22a form a radial configuration which begins proximate a rotor shaft 20 and substantially traces a pair of spirals out to the periphery of the core 10. The slots are adapted to receive thin, articulated permanent magnets 12, and each permanent magnet is retained at a given angle α with respect to the direction of the main flux flow path through the motor as it is oriented adjacent the respective magnets. It will be seen that in this spiral configuration, angle α describes both the angle between the individual magnets and the main flux flow paths and the angle between the respective longitudinal axes of adjacent magnets in the spiral configuration.

The shaft 20 used in the rotor shown in FIG. 5 should be non-magnetic, meaning that it does not have an intrinsic fluxcarrying capability. This non-magnetic shaft provides a high reluctance to flux and confines the flux to the main flux flow paths shown by the broad arrows. Two main flux flow reluctance bridges, indicated individually at 24 and 24a, separate slots 22 and 22a from the shaft 20 and serve to confine the flux to the main flux flow paths so that the flux produces the relatively broad north (N) and south (S) magnetic poles designated by the diamond-headed arrows 18a and 18b, respectively.

Any of the previously described embodiments are useful as an element or rotor in a dynamoelectric machine such as a synchronous motor. When so used, an amortisseur or squirrel cage winding may be added. As is well-known, an amortisseur winding makes the motor operation more stable and precise by providing additional torque during speed-changing, starting, load-carrying, and other transient conditions. It should be appreciated that the use of such a winding in combination with the embodiments of the invention described above will afford a convenient means for holding the core laminations together, despite the extensive slot patterns in the laminations.

Although specific embodiments of the invention have been shown and described, those skilled in the art will understand that various modifications and alternative forms of the invention may be developed from the basic teaching presented herein. For example, it will be apparent that the invention can be used to improve the operating characteristics of direct current dynamoelectric machines, as well as being adaptable to a.c. machines of the type specifically discussed above. Therefore, it is intended by the appended claims to cover all such modifications and changes as fall within the true spirit and scope of the invention.

What is claimed is:

1. A dynamoelectric machine rotor comprising:
   a. a core having magnetic properties including a design core flux density $B_c$ approximately equal to the saturation flux density of the core material;
   b. a plurality of permanent magnets disposed relative to said core for cooperatively producing flux in a plurality of main flux flow paths in said core, each of said permanent magnets having a flux density $B_m$ at a desired operating point which is substantially less than the design flux density $B_c$ in the core, and
   c. means for retaining each of said permanent magnets at a predetermined angle α relative to the main flux flow paths, the sine of said angle α being about the quotient of the magnet flux density $B_m$ at said desired operating point divided by the design flux density $B_c$ of the core.

2. The invention defined in claim 1 including a rotatably mounted shaft secured in said core and extending axially therefrom.

3. The apparatus as recited in claim 2 wherein said permanent magnets are a cobalt rare-earth type.

4. The apparatus as recited in claim 3 wherein said means for retaining each of said permanent magnets comprises means defining a plurality of substantially straight slots through said core for receiving said magnets, each adjacent pair of said slots having a radial orientation to form a V-shaped figure with the magnets mounted, respectively, therein.

5. The apparatus as recited in claim 4 further including a plurality of main flux flow reluctance bridges separating the nearest poles of adjacent magnets from one another at the outer periphery of said core.

6. The apparatus as recited in claim 5 further including an amortisseur winding mounted in operative relationship on said core.

7. The apparatus as recited in claim 3 wherein said means for retaining each of said permanent magnets comprises means defining a plurality of generally straight slots extending through the core, for receiving said magnets, said plurality of slots being arranged to define a plurality of magnet receiving spirals that each begin, respectively, at spaced-apart first preselected points adjacent said shaft and extend to second preselected points adjacent the periphery of the core.

8. The apparatus as recited in claim 7 wherein:
a. said shaft is formed of a non-magnetic material; and further including,
b. a plurality of reluctance bridges between said shaft and the respective inner ends of said spirals, thereby to separate the main flux flow paths from each other.

* * * * *